United States Patent
Khlass et al.

(10) Patent No.: US 12,349,163 B2
(45) Date of Patent: Jul. 1, 2025

(54) DOWNLINK CHANNEL MONITORING

(71) Applicant: Nokia Technologies Oy, Espoo (FI)

(72) Inventors: Ahlem Khlass, Massy (FR); Rapeepat Ratasuk, Naperville, IL (US); Nitin Mangalvedhe, Naperville, IL (US); Antti Anton Toskala, Espoo (FI); Srinivasan Selvaganapathy, Bangalore (IN); Jussi-Pekka Koskinen, Oulu (FI); Samuli Heikki Turtinen, Oulu (FI); Luis Guilherme Uzeda Garcia, Massy (FR)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/909,621

(22) Filed: Oct. 8, 2024

(65) Prior Publication Data

US 2025/0039900 A1    Jan. 30, 2025

Related U.S. Application Data

(63) Continuation of application No. 18/245,319, filed as application No. PCT/EP2021/075853 on Sep. 21, 2021.

(Continued)

(51) Int. Cl.
*H04W 72/231* (2023.01)
*H04W 76/28* (2018.01)

(52) U.S. Cl.
CPC ......... *H04W 72/231* (2023.01); *H04W 76/28* (2018.02)

(58) Field of Classification Search
CPC .... H04W 72/231; H04W 48/16; H04W 76/28
See application file for complete search history.

(56) References Cited

U.S. PATENT DOCUMENTS

2020/0037389 A1    1/2020  Feuersaenger et al.
2020/0044789 A1*   2/2020  Beale .................. H04L 25/0224
(Continued)

FOREIGN PATENT DOCUMENTS

CN        110352616 A    10/2019
EP        2365658 A1     9/2011
(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300, V16.1.0, Mar. 2020, pp. 1-386.

(Continued)

*Primary Examiner* — Andrew Lee
(74) *Attorney, Agent, or Firm* — Nokia Technologies Oy

(57) ABSTRACT

An apparatus is provided comprising at least one processor; and at least one memory including computer program code. The at least one memory and the computer program code are configured to, with the at least one processor, cause the apparatus at least to perform transmitting a data transmission while the apparatus is in a radio resource control idle state or radio resource control inactive state; receiving a monitoring configuration for use by the apparatus subsequent to transmission of the data transmission; and monitoring at least one downlink channel based, at least in part, on the received monitoring configuration.

13 Claims, 10 Drawing Sheets

Related U.S. Application Data

(60) Provisional application No. 63/092,766, filed on Oct. 16, 2020.

(56) References Cited

U.S. PATENT DOCUMENTS

| | | | | |
|---|---|---|---|---|
| 2021/0195579 | A1* | 6/2021 | Lei | H04W 72/51 |
| 2021/0250922 | A1* | 8/2021 | Xu | H04L 5/0053 |
| 2022/0232600 | A1* | 7/2022 | Kim | H04W 72/1273 |
| 2022/0295540 | A1* | 9/2022 | Tsai | H04W 24/08 |
| 2022/0322418 | A1* | 10/2022 | Kim | H04L 1/0008 |
| 2023/0102937 | A1* | 3/2023 | Kim | H04W 76/27 370/329 |
| 2023/0156759 | A1* | 5/2023 | Jin | H04L 5/001 370/329 |
| 2023/0180223 | A1* | 6/2023 | Tseng | H04W 76/27 370/329 |
| 2023/0284264 | A1* | 9/2023 | Kim | H04W 76/11 370/329 |
| 2023/0319892 | A1* | 10/2023 | Zheng | H04W 74/0833 370/329 |

FOREIGN PATENT DOCUMENTS

| | | |
|---|---|---|
| WO | 2018/204886 A1 | 11/2018 |
| WO | 2020/069103 A1 | 4/2020 |
| WO | 2020/076033 A1 | 4/2020 |
| WO | 2020/092415 A1 | 5/2020 |

OTHER PUBLICATIONS

"Work Item on NR smalldata transmissions in Inactive state", 3GPP TSG RAN Meeting #86, RP-193252, Agenda Item: 9.1.2, ZTE Corporation, Dec. 9-12, 2019, 4 pages.

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331, V16.0.0, Mar. 2020, pp. 1-1048.

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

"3rd Generation Partnership Project; Technical Specification Group Radio Access Network; NR; NR and NG-RAN Overall Description; Stage 2 (Release 16)", 3GPP TS 38.300, V16.1.0, Mar. 2020, pp. 1-133.

"Further Pre-configured UL Resources Design Considerations", 3GPP TSG-RAN WG2 Meeting #109 electronic, R2-2001516, Agenda Item: 7.2.4, Sierra Wireless, Feb. 24-Mar. 6, 2020, 3 pages.

"Remaining issues in PUR", 3GPP TSG RAN WG1 #99, R1-1912333, Agenda Item: 6.2.1.2, Sony, Nov. 18-22, 2019, 6 pages.

"D-PUR Configuration Details", 3GPP TSG-RAN WG2 Meeting#106, R2-1907244, Agenda Item: 12.2.4, Sierra Wireless, May 13-17, 2019, pp. 1-5.

"PUR L1 ACK and application layer response", 3GPP TSG-RAN WG2 Meeting #108, R2-1915241, Agenda Item: 7.2.4, Sony, Nov. 18-22, 2019, 4 pages.

"Consideration of T300 and Contention Resolution Timer for EDT in eFeMTC and FeNB-IoT", 3GPP TSG-RAN WG2 #101bis, R2-1805530, Agenda Item: 9.14.2, Kyocera, Apr. 16-20, 2018, 5 pages.

"3rd Generation Partnership Project; Technical Specification Group Radio Access Network; Evolved Universal Terrestrial Radio Access (E-UTRA); Medium Access Control (MAC) protocol specification (Release 16)", 3GPP TS 36.321, V16.1.0, Jul. 2020, pp. 1-141.

"3rd Generation Partnership Project; Technical Specification Group Radio Access Network; NR; Medium Access Control (MAC) protocol specification (Release 16)", 3GPP TS 38.321, V16.1.0, Jul. 2020, pp. 1-151.

"Remaining aspects from [106#61] D-PUR Request, (re)configuration and release mechanism", 3GPP TSG-RAN WG2 Meeting #107-Bis, R2-1913600, Agenda Item: 7.2.4, 7.1.4, Qualcomm Incorporated, Oct. 14-18, 2019, 7 pages.

"Network based D-PUR configuration and release", 3GPP TSG-RAN2 meeting#106, R2-1905643, Agenda Item: 12.2.4, ZTE Corporation, May 13-17, 2019, 4 pages.

International Search Report and Written Opinion received for corresponding Patent Cooperation Treaty Application No. PCT/EP2021/075853, dated Dec. 23, 2021, 13 pages.

"UE assistance information design for power saving", 3GPP TSG-RAN WG2 Meeting #106, R2-1905961, Agenda Item: 11.11.4.4, Vivo, May 13-17, 2019, 4 pages.

\* cited by examiner

DOWNLINK CHANNEL MONITORING

RELATED APPLICATIONS

The present application is a 37 C.F.R. § 1.53(b) continuation of co-pending U.S. patent application Ser. No. 18/245,319 filed Mar. 14, 2023, which claims priority to PCT Application No. PCT/EP2021/075853, filed on Sep. 21, 2021, which claims priority to U.S. Provisional Application No. 63/092,766, filed on Oct. 16, 2020, which is incorporated herein by reference in its entirety.

TECHNOLOGICAL FIELD

Embodiments of the present disclosure relate to downlink channel monitoring. Some relate to downlink channel monitoring after a data transmission in a RRC idle or RRC inactive state.

BACKGROUND

A wireless network comprises a plurality of network nodes including terminal nodes and access nodes. Communication between the terminal nodes and access nodes is wireless.

In some circumstances it may be desirable to modify and/or enhance downlink channel monitoring.

BRIEF SUMMARY

According to various, but not necessarily all, embodiments there is provided examples as claimed in the appended claims.

According to various, but not necessarily all, embodiments there is provided an apparatus comprising
  at least one processor; and
  at least one memory including computer program code;
  the at least one memory and the computer program code configured to, with the at least one processor, cause the apparatus at least to perform:
  transmitting a data transmission while the apparatus is in a radio resource control idle state or radio resource control inactive state;
  receiving a monitoring configuration for use by the apparatus subsequent to transmission of the data transmission;
  monitoring at least one downlink channel based, at least in part, on the received monitoring configuration.

According to various, but not necessarily all, embodiments there is provided a method comprising:
  transmitting a data transmission while an apparatus is in a radio resource control idle state or radio resource control inactive state;
  receiving a monitoring configuration for use by the apparatus subsequent to transmission of the data transmission;
  monitoring at least one downlink channel based, at least in part, on the received monitoring configuration.

According to various, but not necessarily all, embodiments there is provided a computer program comprising instructions for causing an apparatus to perform at least:
  transmitting a data transmission while the apparatus is in a radio resource control idle state or radio resource control inactive state;
  receiving a monitoring configuration for use by the apparatus subsequent to transmission of the data transmission;
  monitoring at least one downlink channel based, at least in part, on the received monitoring configuration.

According to various, but not necessarily all, embodiments there is provided an apparatus comprising
  at least one processor; and
  at least one memory including computer program code;
  the at least one memory and the computer program code configured to, with the at least one processor, cause the apparatus at least to perform:
  receiving a data transmission from a transmitting apparatus, while the transmitting apparatus is in a radio resource control idle state or a radio resource control inactive state;
  determining a monitoring configuration for the transmitting apparatus to use subsequent to transmission of the data transmission;
  transmitting the monitoring configuration to the transmitting apparatus.

According to various, but not necessarily all, embodiments there is provided a method comprising:
  receiving a data transmission from a transmitting apparatus, while the transmitting apparatus is in a radio resource control idle state or a radio resource control inactive state;
  determining a monitoring configuration for the transmitting apparatus to use subsequent to transmission of the data transmission;
  transmitting the monitoring configuration to the transmitting apparatus.

According to various, but not necessarily all, embodiments there is provided A computer program comprising instructions for causing an apparatus to perform at least:
  receiving a data transmission from a transmitting apparatus, while the transmitting apparatus is in a radio resource control idle state or a radio resource control inactive state;
  determining a monitoring configuration for the transmitting apparatus to use subsequent to transmission of the data transmission;
  transmitting the monitoring configuration to the transmitting apparatus.

According to various, but not necessarily all, embodiments there is provided a computer program comprising instructions for causing an apparatus to perform at least a part of one or more methods disclosed herein.

According to various, but not necessarily all, embodiments there is provided an apparatus comprising means for performing at least a part of one or more methods disclosed herein.

According to various, but not necessarily all, embodiments there is provided an apparatus comprising
  at least one processor; and
  at least one memory including computer program code;
  the at least one memory and the computer program code configured to, with the at least one processor, cause the apparatus at least to perform at least a part of one or more methods disclosed herein.

The description of a function and/or action should additionally be considered to also disclose any means suitable for performing that function and/or action.

BRIEF DESCRIPTION

Some examples will now be described with reference to the accompanying drawings in which.

DEFINITIONS

RRC Connected—A UE is in RRC Connected state when an RRC connection has been established.

RRC Idle—A UE is in RRC Idle state if no RRC connection is established.

RRC Inactive—A UE is in RRC Inactive state when RRC connection is suspended.

RRC State switching-RRC state switching when a UE moves from an RRC state to another RRC state.

Discontinuous Reception (DRX)—When in RRC Connected, if DRX is configured, the MAC entity is allowed to monitor the PDCCH discontinuously, or in cycles. When in RRC Idle a UE needs only to monitor one Paging Occasion (PO) per DRX cycle. One Paging Frame (PF) is one Radio Frame, which may contain one or multiple PO(s).

DRX configuration—Configuration for performing DRX.

Assistance Information—Information provided by a UE to the network to assist the network in performing one or more functions.

RRCConnectionResumeRequest message—When a UE decides to resume the RRC connection, the UE sends the RRCConnectionResumeRequest message. An RRCConnectionResumeRequest message can include information on the cause of the resumption, UE identity and/or authentication information.

RRCConnectionRelease message—Message sent by network to release the RRC connection, which includes the release of the established radio bearers as well as all radio resources. RRCConnectionRelease message can be sent to a UE in RRC Connected or RRC Inactive or to complete user plane early data transmission (UP-EDT) or UP transmission using pre-configured uplink resource (PUR).

RRCEarlyDataRequest message—Message used to initiate control plane EDT (CP-EDT).

RRCEarlyDataComplete message—Message used to confirm the successful completion of the CP-EDT procedure.

RRCResumeRequest message—The RRCResumeRequest message is used to request the resumption of a suspended RRC connection or perform an RAN-based Notification Area (RNA) update.

RRCRelease message—Message used to command the release of an RRC connection or the suspension of the RRC connection, which includes the release of the established radio bearers as well as all radio resources. Message can be used to complete small data transmission (SDT).

DETAILED DESCRIPTION

Figure 1:
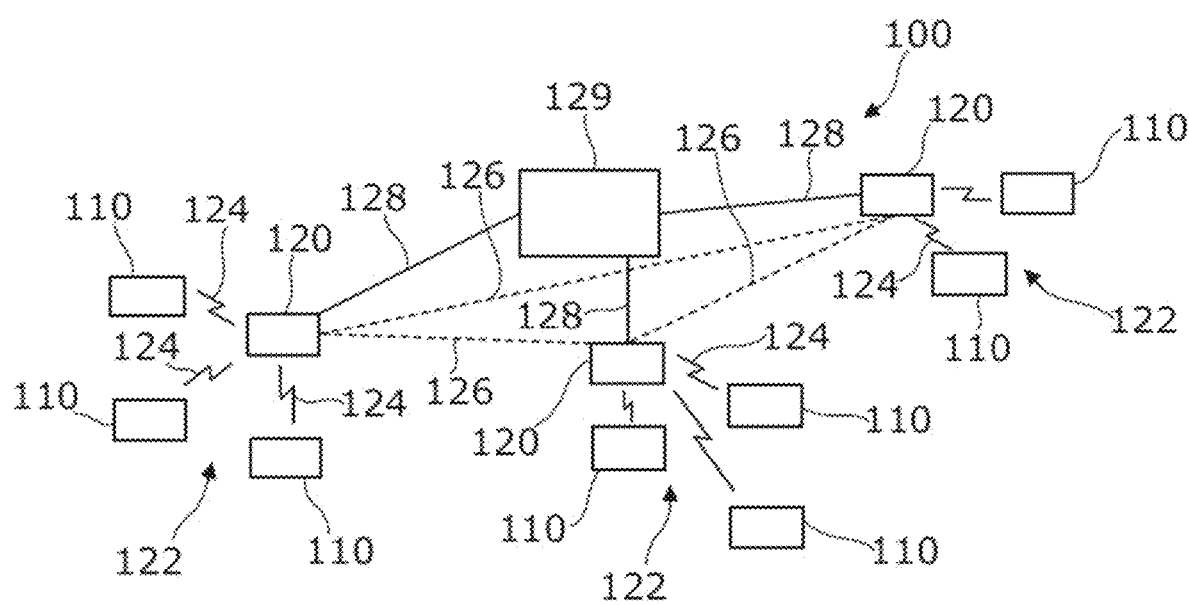
FIG. 1 shows an example of the subject matter described herein.

FIG. 1 illustrates an example of a network 100 comprising a plurality of network nodes including terminal nodes 110, access nodes 120 and one or more core nodes 129. The terminal nodes 110 and access nodes 120 communicate with each other. The one or more core nodes 129 communicate with the access nodes 120.

The network 100 is in this example a telecommunications network, in which at least some of the terminal nodes 110 and access nodes 120 communicate with each other using transmission/reception of radio waves/signals.

The one or more core nodes 129 may, in some examples, communicate with each other. The one or more access nodes 120 may, in some examples, communicate with each other.

The network 100 may be a cellular network comprising a plurality of cells 122 each served by an access node 120. In this example, the interface between the terminal nodes 110 and an access node 120 defining a cell 122 is a wireless interface 124.

The access node 120 is a cellular radio transceiver. The terminal nodes 110 are cellular radio transceivers.

In the example illustrated the cellular network 100 is a third generation Partnership Project (3GPP) network in which the terminal nodes 110 are user equipment (UE) and the access nodes 120 are base stations (for example, gNBs).

In the particular example illustrated the network 100 is an Evolved Universal Terrestrial Radio Access network (E-UTRAN). The E-UTRAN consists of E-UTRAN NodeBs (eNBs), providing the E-UTRA user plane and control plane (for example, RRC) protocol terminations towards the UE. The eNBs 120 are interconnected with each other by means of an X2 interface 126. The eNBs are also connected by means of the S1 interface 128 to the Mobility Management Entity (MME) 129.

In other example the network 100 is a Next Generation (or New Radio, NR) Radio Access network (NG-RAN). The NG-RAN consists of gNodeBs (gNBs), providing the user plane and control plane (for example, RRC) protocol terminations towards the UE. The gNBs are interconnected with each other by means of an X2/Xn interface 126. The gNBs are also connected by means of the N2 interface 128 to the Access and Mobility management Function (AMF).

In examples, the network 100 can comprise a combination of E-UTRAN and NG-RAN.

Figure 2:
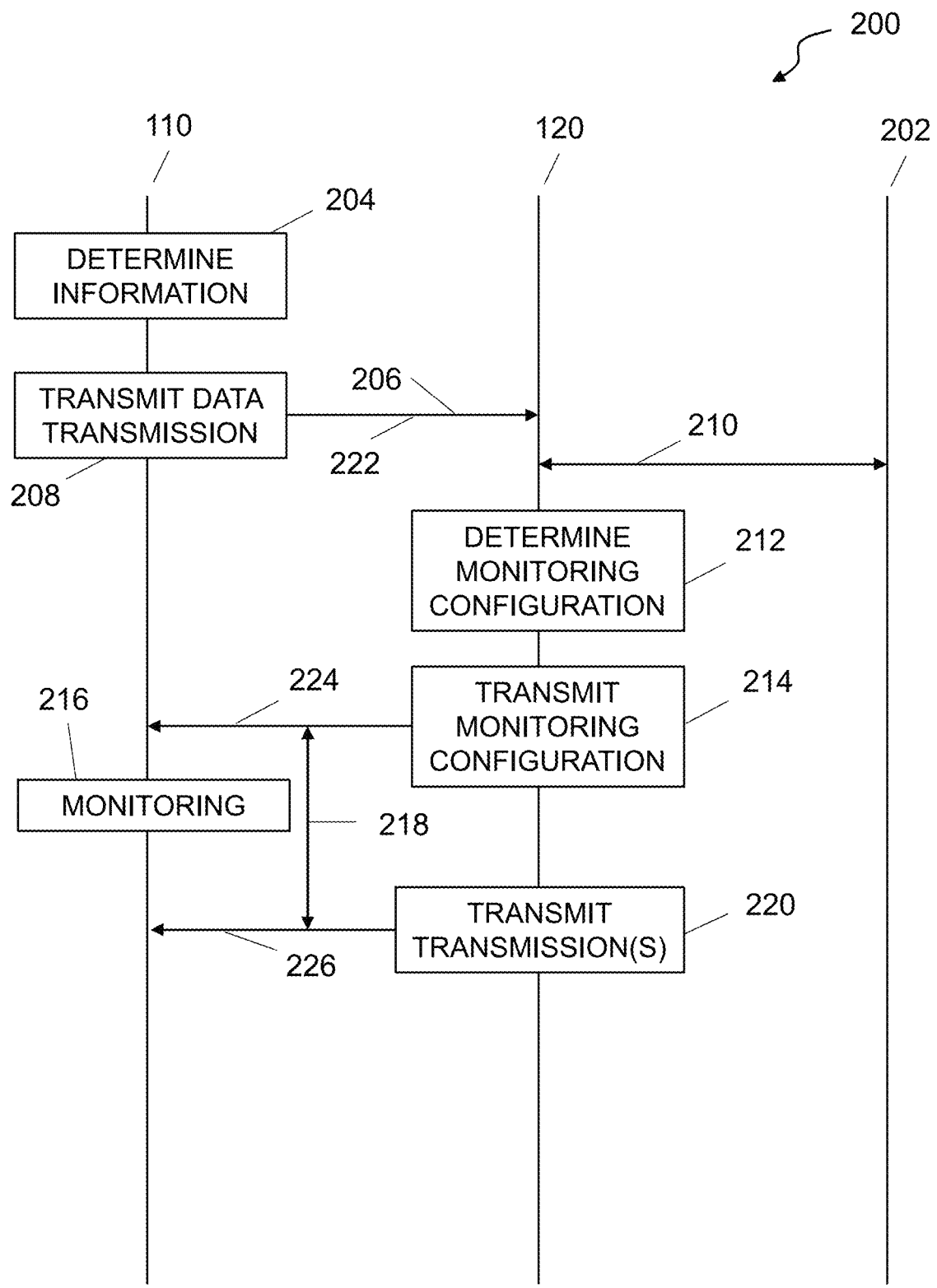
FIG. 2 shows another example of the subject matter described herein.

FIG. 2 illustrates an example of a method 200.

In examples, FIG. 2 can be considered to illustrate a plurality of methods. For example, FIG. 2 illustrates one or more actions at a plurality of actors/entities. In examples, FIG. 2 can be considered to illustrate a plurality of methods performed by the individual actors/entities.

In the example of FIG. 2, a plurality of apparatuses transmit and/or receive one or more signals and/or one or more messages across and/or via and/or using a network. In examples, any suitable form of communication in any suitable network setup can be used. For example, at least a portion of network 100 of FIG. 1 can be used.

Accordingly, in examples, the plurality of apparatuses in FIG. 2 form at least a portion of a network 100 as described in relation to FIG. 1.

In the illustrated example, a terminal node 110, such as a UE, an access node 120, such as a gNB or eNB, and an application server 202 transmit and/or receive one or more signals and/or one or more messages.

In examples, communications and/or transmissions between elements illustrated in FIG. 2 can proceed via any number of intervening elements, including no intervening elements.

Although three network nodes 110, 120, 202 are illustrated in the example of FIG. 2, in examples any suitable number of network nodes can be included.

In the example of FIG. 2, the terminal node 110, is in a radio resource control (RRC) idle state or RRC inactive state.

At block 204, the method 200 comprises determining information 206 to be used in determining a monitoring configuration 224. In examples, the information 206 can be considered assistance information 206.

In the example of FIG. 2, the location of the blocks indicate the entity performing the action(s). For example, in FIG. 2 block 204 is performed at and/or by the terminal node 110.

In some examples, the monitoring configuration 224 is and/or can be considered to be a monitoring configuration 224 to be used by the terminal node 110 and/or to configure monitoring at and/or by the terminal node 110 and/or for application by the terminal node 110.

Any suitable method for determining assistance information 206 to be used in determining a monitoring configuration 224 can be used.

As used herein, the term "determining" (and grammatical variants thereof) can include, not least: calculating, computing, processing, deriving, investigating, looking up (for example, looking up in a table, a database or another data structure), ascertaining and the like. Also, "determining" can include receiving (for example, receiving information), accessing (for example, accessing data in a memory) and the like. Also, "determining" can include resolving, selecting, choosing, establishing, and the like.

In examples, the assistance information 206 can comprise any suitable assistance information 206 for use in determining a monitoring configuration 224.

In some examples, the assistance information 206 comprises assistance information 206 of the terminal node 110, and/or assistance information 206 determined by the terminal node 110, that can be used in determining a monitoring configuration 224.

Additionally, or alternatively, the assistance information 206 can comprise at least an indication of one or more preferences of the terminal node 110 for the monitoring configuration 224.

In examples, the assistance information 206 comprises at least one of:
  one or more monitoring preferences; and
  support for preconfigured physical downlink shared channel (PDSCH) transmission within the resource used for monitoring physical downlink control channel (PDCCH).

In examples, the one or more monitoring preferences comprises a PDCCH monitoring preference. For example, for transmission control protocol (TCP) ACK for early data transmission (EDT).

Support for PDSCH transmission within the resource used for monitoring PDCCH can have any suitable form. In some examples, the assistance information comprises a flag which can be set to true to inform the network that the terminal node 110 supports PDSCH transmission for subsequent downlink transmission after data transmission 222 (block 208).

In some examples, block 204 can be omitted from method 200.

At block 208, the method 200 comprises transmitting a data transmission 222 from the terminal node 110 to the access node 120.

Accordingly, FIG. 2 illustrates transmitting a data transmission 222 while an apparatus is in a RRC idle state or a RRC inactive state.

From the point of view of the terminal node 110, FIG. 2 illustrates transmitting, by an apparatus, a data transmission 222 while the apparatus is in a RRC idle state or a RRC inactive state.

As FIG. 2 illustrates one or more actions of transmission, FIG. 2 also illustrates the corresponding receiving feature(s)/action(s).

For example, block 208 can be considered to illustrate receiving, at the access node 120, a data transmission 222 from a transmitting apparatus, while the transmitting apparatus is in a RRC idle state or a RRC inactive state.

In examples, from the point of view of the access node 120, the terminal node 110 can be considered to be a transmitting apparatus, with regard to the data transmission 222.

The data transmission 222 can have any suitable form and can comprise any suitable information.

In examples, the data transmission 222 comprises and/or is an early data transmission (EDT) or a small data transmission (SDT) and/or forms part of an EDT or SDT process.

In some examples, the data transmission 222 can be considered to be a 3rd Generation Partnership Project (3GPP) EDT or a 3GPP SDT and/or to form part of a 3GPP EDT or a 3GPP SDT process.

Accordingly, in examples, data transmission 222 can comprise information transmitted as part of a 3GPP EDT or a 3GPP SDT process.

In examples, an EDT or SDT transmission happens while a terminal node 110, such as a UE, is in an RRC idle or RRC inactive state.

In examples, the data transmission 222 can comprise at least a portion of the assistance information 206 determined at block 204.

This is illustrated in FIG. 2 by the reference numeral '206' linked to data transmission 222.

Accordingly, FIG. 2 illustrates determining assistance information 206 to be used in determining the monitoring configuration 224 and transmitting the determined assistance information 206.

FIG. 2 also illustrates receiving, at the access node 120, the assistance information 206.

In examples, transmitting the data transmission 222 comprises transmitting without causing an associated RRC state switching at the apparatus, which in the example of FIG. 2 is a terminal node 110.

For example, in the example of FIG. 2, transmitting the data transmission 222 at block 208 can comprise transmitting the data transmission 222 without causing an associated RRC state switching at the terminal node 110.

In some examples, transmitting without causing an associated RRC state switching at an apparatus can be considered transmitting without causing a RRC state switching at an apparatus in response to and/or based, at least in part, on, and/or as a consequence of the data transmission 222.

In examples, receiving, at the access node 120, a data transmission 222 from a transmitting apparatus, while the transmitting apparatus is in a RRC idle state or a RRC inactive state can be considered receiving a data transmission 222 from a transmitting apparatus, without initiating and/or without enabling and/or without causing a RRC state change at the transmitting apparatus.

In examples, the data transmission 222 can form at least part of any suitable process when an apparatus, such as the terminal node 110, is in a RRC idle state or a RRC inactive state.

In some examples, the data transmission 222 and/or transmitting the data transmission 222 forms at least part of a random access procedure. For example, the data transmission 222 can form part of a 3GPP Random Access Channel (RACH) procedure.

In examples, a 4-step RACH procedure or a 2-step RACH procedure can be used.

In some examples, data transmission 222 can comprise and/or be Msg3 of a RACH procedure, for example a 4-step RACH procedure.

In some examples, data transmission 222 can comprise and/or be MsgA of a RACH procedure, for example a 2-step RACH procedure.

In some examples, data transmission 222 can comprise and/or be uplink (UL) data on preconfigured Physical Uplink Shared Channel (PUSCH) resources.

Additionally, or alternatively, the data transmission 222 and/or transmitting the data transmission 222 can form part of a 3GPP EDT or SDT procedure.

In some examples, data transmission 222 is and/or comprises a 3GPP RRCConnectionResumeRequest message.

In some examples, data transmission 222 is and/or comprises a 3GPP RRCEarlyDataRequest message.

In some examples, data transmission 222 is and/or comprises a 3GPP RRCResumeRequest message.

In examples, information can be transmitted between the access node 120 and the application server 202. This is illustrated by the double headed arrow labelled 210 in the example of FIG. 2.

Any suitable information can be transmitted between the access node 120 and the application server 202 in any suitable way and at any suitable time or times. Accordingly, in examples, information can be transmitted between the access node 120 and the application server 202 on a plurality of occasions at different times.

Accordingly, in examples, the method 200 can be considered to comprise receiving, at the access node 120, information from at least one application server 202.

In some examples the access node 120 can estimate at least one response time of the at least one application server 202.

Accordingly, in some examples, the method 200 comprises estimating, by the access node 120, at least one response time of the at least one application server 202.

Any suitable method for estimating at least one response time of the at least one application server 202 can be used.

In some examples, the access node 120 actively probes the application server 202 to estimate a response time. For example, the access node can send out-of-band internet control message protocol (ICMP) echo requests (pings) to the server's IP address.

In some examples, at least one response time can be estimated based, at least in part, on samples for packets exchanged on a per-connection basis from previous sessions or multi-shot SDT transmissions to derive a (Smoothed) round trip time (RTT).

In some examples, a parallel transmission control protocol (TCP) connection can be opened between a local host (a proxy) running an ordinary pcap (packet capture) reader and the IP address of the other TCP endpoint of interest.

In examples, these values would be exported to the access node. The Uu delay can be factored into the values.

In examples, at least a part of the data transmission 222 is transmitted from the access node 120 to the application server 202.

Accordingly, in examples, the method 200 comprises transmitting, by the access node 120, at least part of the data transmission 222 to at least one application server 202.

For example, EDT or SDT uplink data is transmitted to the application server 202.

In examples, an acknowledgement for the at least part of the data transmission 222 is received from the application server 202 by the access node 120.

At block 212, the method 200 comprises determining a monitoring configuration 224 for the transmitting apparatus to use subsequent to transmission of the data transmission 222.

In examples, determining a monitoring configuration 224 for the transmitting apparatus to use can be considered determining a monitoring configuration 224 for use by a terminal node 110 subsequent to transmitting the data transmission 222.

Any suitable method for determining a monitoring configuration 224 can be used.

For example, the monitoring configuration 224 can be determined based, at least in part, on any suitable information received from any suitable source.

In examples, the monitoring configuration 224 comprises information to configure, at least in part, the monitoring of at least one downlink channel, by the transmitting apparatus, subsequent to transmission of the data transmission 222.

A downlink channel can, in examples, be considered at least one frequency range. In examples, any suitable frequency range or ranges can be used.

In examples, the frequency range or ranges covers at least a portion of frequencies supported by new radio (NR).

In some examples, the frequency range downlink monitoring depends on the bandwidth part associated to the terminal node 110 when moved to RRC idle or RRC inactive state.

In examples at least one downlink channel can be and/or comprise a Physical Downlink Control Channel (PDCCH).

In the example of FIG. 2 the monitoring configuration 224 comprises information to configure, at least in part, the monitoring of at least one downlink channel, by the terminal node 110, subsequent to transmission of the data transmission 222.

In examples, the monitoring configuration 224 comprises information to configure, at least in part, the transmitting apparatus to perform monitoring of at least one downlink channel when expected downlink data, such as an acknowledgement, can be expected.

In examples, the monitoring configuration 224 comprises information to configure, at least in part, the transmitting apparatus to perform monitoring of at least one downlink channel in response to and/or based, at least in part, and/or as a consequence of transmission of the data transmission 222.

In examples, the monitoring configuration 224 can be considered monitoring configuration 224 for the terminal node 110 to apply after EDT or SDT.

In some examples, the monitoring configuration 224 comprises at least one of:
  one or more monitoring periods 218;
  one or more number of monitoring occasions;
  a discontinuous reception (DRX) configuration;

one or more PDCCH search space configurations; and one or more monitoring timer values.

In examples, the one or more monitoring periods and number of monitoring occasions are configured to control when and/or for how long, the terminal node 110 monitors the at least one downlink channel and how many times the monitoring is to occur.

In some examples, a suitable monitoring period is shorter than a DRX-off period for a terminal node 110, such as a UE, in RRC idle or RRC inactive state.

In examples, a DRX configuration can be considered an adapted DRX configuration. In some examples, a DRX configuration comprises one or more DRX related parameters.

A PDCCH search space configuration can refer to an area in a downlink resource grid where PDCCH may be carried.

The monitoring timer value(s) can be used in examples where an early acknowledgement for the data transmission 222 is provided to the terminal node 110 and/or in stopping monitoring.

In some example, the monitoring configuration 224 comprises at least one of a PDCCH monitoring configuration, and a PDSCH monitoring configuration.

In examples, the monitoring configuration 224 is determined based, at least in part, on the assistance information 206 received from the transmitting apparatus. For example, in the example of FIG. 2 the monitoring configuration 224 can be determined based, at least in part, on assistance information 206 received from the terminal node 110.

Accordingly, in some examples, the method 200 comprises receiving assistance information 206, by the access node 120, from the transmitting apparatus; and determining the monitoring configuration 224 based, at least in part, on the assistance information 206 received from the transmitting apparatus.

For example, the monitoring configuration 224 can be determined based, at least in part, on one or more monitoring preferences of the transmitting apparatus and/or one or more monitoring capabilities of the transmitting apparatus.

Additionally, or alternatively, in some examples, the monitoring configuration 224 is determined based, at least in part, on the information received from the application server 202.

Accordingly, in some examples, method 200 comprises determining the monitoring configuration 224 based, at least in part, on an estimated response time of the application server 202.

At block 214 the monitoring configuration 224 is transmitted from the access node 120 to the terminal node 110.

Accordingly, from the point of view of the access node 120, the method 200 comprises transmitting the monitoring configuration 224 to the transmitting apparatus.

Consequently, FIG. 2 illustrates a method comprising:
receiving a data transmission 222 from a transmitting apparatus, while the transmitting apparatus is in a RRC idle state or a RRC inactive state;
determining a monitoring configuration 224 for the transmitting apparatus to use subsequent to transmission of the data transmission 222; and
transmitting the monitoring configuration 224 to the transmitting apparatus.

In examples, transmitting the monitoring configuration 224 to the transmitting apparatus can be considered configuring and/or adapting and/or controlling monitoring at the transmitting apparatus.

From the point of view of the terminal node 110, block 214 illustrates receiving a monitoring configuration 224 for use by the apparatus subsequent to transmission of the data transmission 222.

As illustrated in the example of FIG. 2 the monitoring configuration 224 can be the monitoring configuration 224 determined at block 212 and can therefore be as described in relation to block 212.

In examples, the transmission of the monitoring configuration 224 can form at least part of any suitable process when an apparatus, such as the terminal node 110, is in a RRC idle state or a RRC inactive state.

In some examples, the transmission of the monitoring configuration 224 and/or transmitting the monitoring configuration 224 forms at least part of a random access procedure. For example, the transmission of the monitoring configuration 224 can form part of a 3GPP Random Access Channel (RACH) procedure.

In examples, a 4-step RACH procedure or a 2-step RACH procedure can be used.

In some examples, transmission of the monitoring configuration 224 can comprise and/or be Msg4 of a RACH procedure, for example a 4-step RACH procedure.

In some examples, transmission of the monitoring configuration 224 can comprise and/or be MsgB of a RACH procedure, for example a 2-step RACH procedure.

Additionally, or alternatively, the transmission of the monitoring configuration 224 and/or transmitting the monitoring configuration 224 can form part of a 3GPP EDT or a 3GPP SDT procedure.

In some examples, the monitoring configuration 224 is at least part of and/or is transmitted with a 3GPP RRCConnectionRelease message.

In some examples, the monitoring configuration 224 is at least part of and/or is transmitted with a 3GPP RRCEarlyDataComplete message.

In some examples, the monitoring configuration 224 is at least part of and/or is transmitted with a 3GPP RRCRelease message.

At block 216 the method 200 comprises monitoring at least one downlink channel based, at least in part, on the received monitoring configuration 224.

In the example of FIG. 2 block 216 illustrates monitoring, by the terminal node 110, at least one downlink channel based, at least in part, on the received monitoring configuration 224.

Consequently, FIG. 2 illustrates a method comprising:
transmitting a data transmission 222 while an apparatus is in a RRC idle state or a RRC inactive state;
receiving a monitoring configuration 224 for use by the apparatus subsequent to transmission of the data transmission 222; and
monitoring at least one downlink channel based, at least in part, on the received monitoring configuration 224.

In examples, monitoring at least one downlink channel based, at least in part, on the received monitoring configuration 224 can be considered adapting and/or altering and/or changing and/or modifying monitoring of at least one downlink channel based, at least in part, on the received monitoring configuration 224.

For example, the received monitoring configuration 224 can be considered control information to control adaptation and/or altering and/or changing and/or modifying monitoring of at least one downlink channel.

In examples, monitoring performed based, at least in part, on the monitoring configuration 224 is adapted and/or altered and/or changed and/or modified compared to a default monitoring process that would be performed by the terminal node 110 if monitoring configuration 224 were not received.

In examples, one or more aspects of the monitoring configuration 224 described in relation to block 214 is applied at block 216 to monitor at least one downlink channel.

In some examples, monitoring the at least one downlink channel can be considered monitoring for subsequent transmission(s) from the access node 120.

In the example of FIG. 2, the monitoring configuration 224 comprises a monitoring period 218, which is applied by the terminal node 110 at block 216.

This is indicated in the example of FIG. 2 by the double headed arrow labelled with '218' which represents the length of the monitoring period in FIG. 2.

Accordingly, in the example of FIG. 2, the terminal node 110 monitors the at least one downlink channel periodically as defined by the monitoring period 218 in the monitoring configuration 224.

In the example of FIG. 2 the terminal node 110 wakes and scans and/or searches for signals on the at least one downlink channel after expiry of a monitoring period 218. The terminal node 110 waking and performing scanning and/or searching can be considered a monitoring occasion.

In examples, the terminal node 110 wakes up on configured monitoring periods for expected downlink data reception.

In FIG. 2, the terminal node 110 monitors the at least one downlink channel after monitoring period 218 has passed. In examples, one or more other aspects of the monitoring are performed as defined and/or instructed in the monitoring configuration 224.

For example, the search space monitored is as defined and/or instructed in the monitoring configuration 224.

At block 220, the access node 120 transmits at least one transmission 226, which can be considered a subsequent transmission 226, to the terminal node 110 in accordance with the determined monitoring configuration 224.

In examples, the at least one transmission 226 can be and/or comprise any suitable transmission 226 comprising any suitable information.

In examples, the at least one transmission 226 can be considered at least one downlink data transmission 226.

In examples, the subsequent transmission 226 comprises at least one acknowledgement of the data transmitted from the transmitting apparatus at block 208 and/or subsequent downlink data transmission 226.

Any suitable form of acknowledgement can be used.

In some examples, the at least one acknowledgement comprises an acknowledgement and/or information indicative of an acknowledgement from the application server 202 for the data transmission 222.

In examples, the transmission 226 is and/or comprises a transmission control protocol (TCP) message such as TCP ACK message. Additionally, or alternatively, other TCP messages can be used.

Accordingly, FIG. 2 illustrates a method 200 comprising transmitting at least one transmission 226 in accordance with the determined monitoring configuration 224, wherein the at least one transmission 226 comprises at least one acknowledgement of the data transmitted by the transmitting apparatus and/or subsequent downlink data transmission 226.

FIG. 2 also illustrates a method 200 comprising receiving at least one subsequent transmission 226 in accordance with the received monitoring configuration 224, wherein the at least one subsequent transmission 226 comprises at least one acknowledgement of the data transmitted by the apparatus and/or subsequent downlink data transmission 226.

In examples, transmitting, and correspondingly receiving, at least one transmission 226 in accordance with the monitoring configuration 224 can be considered transmitting, and correspondingly receiving, at least one transmission at a time and/or in a way and/or using one or more resources as indicated in the monitoring configuration 224.

Accordingly, in examples, the terminal node 110 and access node 120 receive and transmit the at least one subsequent transmission 226 in coordination and/or in synchronization and/or as expected.

In examples, the terminal node 110 can receive the transmission at a time that the terminal node 110 would not be monitoring the at least one downlink control channel if the monitoring configuration 224 were not determined and received.

In examples, the terminal node 110 determines if the at least one subsequent transmission 226 comprises information about the data transmitted by the apparatus; and if it is determined that nothing is received in the at least one subsequent transmission 226, retransmits at least the data transmission 222.

In examples, the terminal node 110 determines if the at least one subsequent transmission 226 comprises an acknowledgement for the data transmission 222 and if it is determined that subsequent transmission 226 does not comprise an acknowledgement for the data transmission 222, retransmits at least the data transmission 222.

In examples, the terminal node 110 performs at least part of block 208 again.

In examples, of nothing is received in the downlink transmission 226, the terminal node 110 declares failure of EDT or SDT and triggers a retransmission of the last payload, which, in FIG. 2, is data transmission 222.

Accordingly, FIG. 2 illustrates a method 200 comprising: determining if the at least one subsequent transmission 226 comprises information about the data transmitted by the apparatus; and if it is determined that nothing is received in the at least one subsequent transmission 226, retransmitting at least the data transmission 222.

In examples, the terminal node 110 retransmits at least the data transmission 222 if no subsequent transmission 226 is received.

In examples, the terminal node 110 continues to monitor the downlink channel until one or more conditions are fulfilled. In examples one or more of the one or more conditions can be included in and/or defined by and/or set by the monitoring configuration 224.

Any suitable condition or conditions for stopping the monitoring can be used.

In examples, the method 200 comprises: stopping the monitoring based, at least in part, on one or more conditions; wherein the one or more conditions comprise at least one of:
 performance of a predetermined number of monitoring occasions; expiry of a monitoring timer;
 receiving one or more signals comprising information indicating to stop monitoring; and
 receiving an acknowledgement of the data transmission 222.

In examples, a value for the monitoring timer is included in/received in the monitoring configuration 224.

In examples, any suitable(s) signal(s) comprising any suitable information indicating to stop monitoring can be used, for example physical layer (PHY) or medium access control (MAC) signaling.

In examples, the one or more signals comprising information indicating to stop monitoring are transmitted by/received from the access node 120.

In some examples, the terminal node 110 stops monitoring in response to receiving an acknowledgement of the data transmission 222 in transmission 226.

In examples, the terminal node 110 stops monitoring and goes to sleep.

Although FIG. 2 illustrates a method 200 involving a terminal node 110, an access node 120 and an application server 202, FIG. 2 should also be considered to disclose a plurality of methods performed by the terminal node 110, by the access node and/or by the application server 202.

Accordingly, FIG. 2 also discloses a method comprising one or more of the actions performed by the terminal node 110, which can be considered an apparatus.

Accordingly, FIG. 2 also discloses a method comprising one or more of the actions performed by the access node 120, which can be considered an apparatus.

Accordingly, FIG. 2 also discloses a method comprising one or more of the actions performed by the application server 202, which can be considered an apparatus.

In examples, one or more of the blocks and/or actions of FIG. 2 can be omitted. For example, block 204 can be omitted.

Examples of the disclosure are advantageous. For example, examples of the disclosure provide for adapting monitoring after a data transmission in RRC idle or RRC inactive state to terminal node, such as UE, requirements and/or expectations and/or expectations in terms of downlink traffic.

For example, use of an adapted monitoring configuration after EDT or SDT allows for efficient reception of subsequent downlink data, such as an acknowledgement, as otherwise an access node, such as eNB or gNB, may miss a first default monitoring cycle of the UE and have to wait a further cycle before being able to transmit to the UE, which would introduce delay and waste UE resources.

Examples of the disclosure provide for efficient terminal node, such as UE, power consumption while terminal node is in RRC idle or RRC inactive state.

Furthermore, reduced latency and/or signaling overhead associated with UE reachability is provided.

Figure 3:
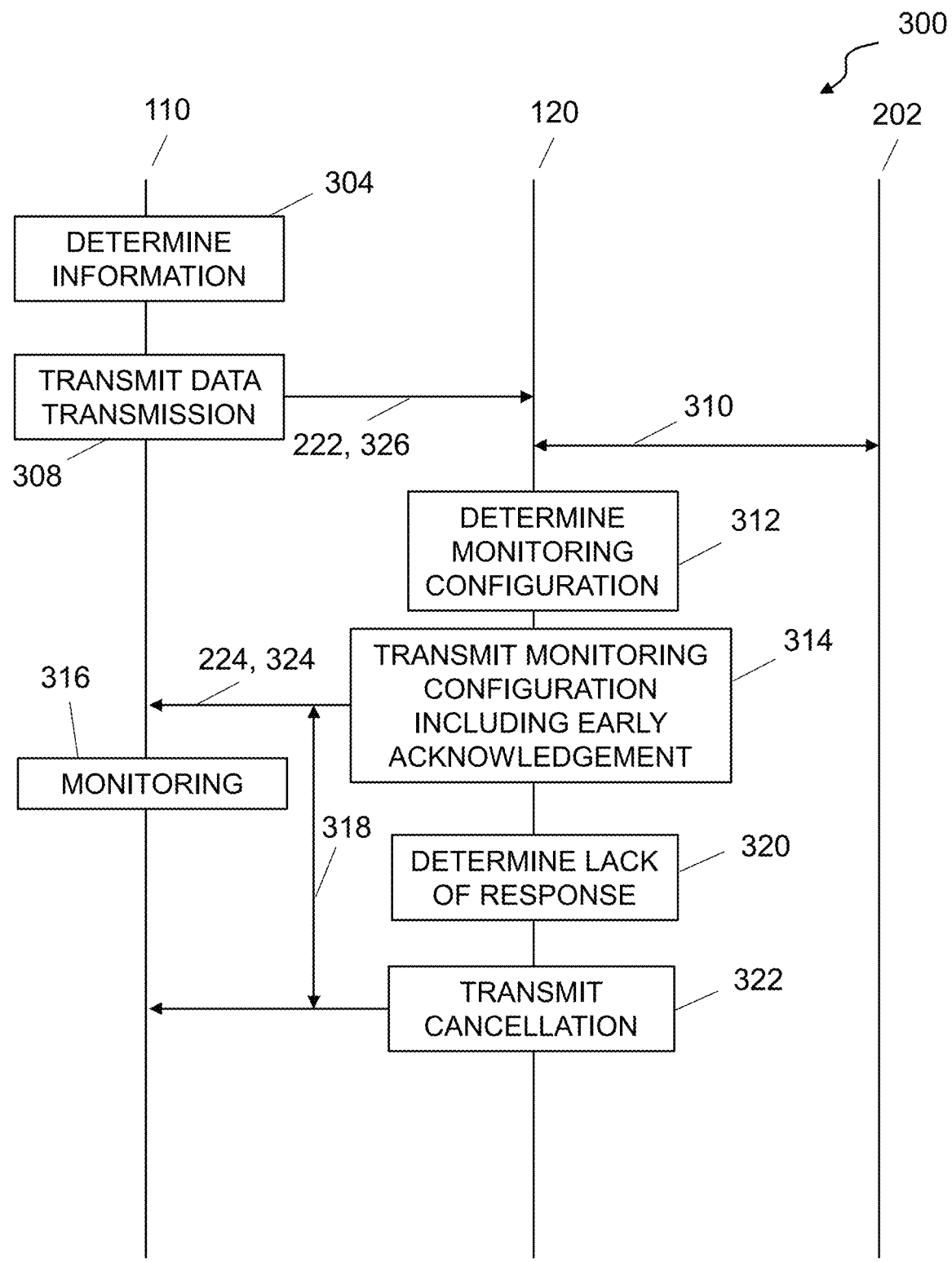
FIG. 3 shows another example of the subject matter described herein.

FIG. 3 illustrates an example of a method 300. The example of FIG. 3 is similar to the example of FIG. 2. The example of FIG. 3 can be considered an example variant on the example of FIG. 2.

Accordingly, FIG. 3 should also be considered to disclose a plurality of methods performed by the actors/entities illustrated in the example of FIG. 3.

In the example of FIG. 3, similarly to FIG. 2, a terminal node 110, such as a UE, an access node 120, such as an eNB or gNB, and an application server 202 communicate across a network.

In the example of FIG. 3, blocks 304, 308, 310, 312, 314, 316 and 318 can be as described in relation to blocks 204, 208, 210, 212, 214, 216 and 218 of FIG. 2 respectively.

However, in the example of FIG. 3 the data transmission 222 comprises an indication 326 that an acknowledgement for the data transmission 222 is expected.

Any suitable indication that an acknowledgement for the data transmission 222 is expected can be used.

In examples, the data transmission 222 comprises information and/or at least one flag indicating that an acknowledgement for the data transmission 222 is expected.

Accordingly, from the point of view of the access node 120, method 300 comprises receiving an indication that an acknowledgement for the data transmission 222 is expected. FIG. 3 also illustrates the corresponding transmitting action at the terminal node 110.

In the example of FIG. 3, at least a part of the data transmission 222 is transmitted to the application server 202 at block 310.

In examples, the access node 120 can estimate the response time to the application server 202 which can be used in determining the monitoring configuration 224.

At block 314, the access node 120 determines the monitoring configuration 224. This can be as described in relation to block 214 of FIG. 2.

However, in the example of FIG. 3, the monitoring configuration 224 comprises an early acknowledgement 324 for the data transmission 222.

In examples, an early acknowledgement 324 can be considered an acknowledgement to be transmitted/transmitted to the terminal node 110 before an acknowledgement for the at least part of the data transmission 222 is received from the application server 202.

For example, in FIG. 3 the monitoring configuration 224 including the early acknowledgement 324 is transmitted to the terminal node 110 at block 224 prior to any acknowledgement for the at least part of the data transmission 222 being received from the application server 202.

In examples, any suitable early acknowledgement 324 can be used. In some examples, the early acknowledgement 324 can be an acknowledgment as described in relation to FIG. 2.

In some examples, the access node 120 gets TCP header information from Msg3/MsgA and uses the header information to generate the early acknowledgement 324.

In some examples, the early acknowledgement 324 can be implicitly assumed by the terminal node 110 based on receipt of the transmission comprising the monitoring configuration 224, which can be a Msg4 or MsgB and/or L1 Ack included therein.

Accordingly, from the point of view of the access node 120, FIG. 3 illustrates a method 300 comprising: receiving an indication 326 that an acknowledgement 324 for the data transmission 222 is expected; and in response to receiving the indication, transmitting an early acknowledgement 324 for the data transmission 222.

FIG. 3 also illustrates the corresponding receiving the early acknowledgement 324 at the terminal node 110.

At block 320, the access node 120 determines a lack of response from the at least one application server 202 in relation to the at least part of the data transmission 222.

Accordingly, at block 320 the method 300 comprises determining a lack of response from the at least one application server 202 in relation to the at least part of the data transmission 222.

Any suitable method for determining a lack of response from the at least one application server 202 in relation to the at least part of the data transmission 222 can be used.

In some examples, the access node 120 starts a timer upon receiving the data transmission 222 or when the at least part of the data transmission 222 is transmitted to the application server 202 and determines a lack of response upon expiry of the timer.

Additionally, or alternatively, the access node 120 can receive one or more signals, from the application server 202, for example, indicating no response for the at least part of the data transmission 222.

In examples, the timer expiry value is transmitted to the terminal node 110 with and/or as part of the monitoring configuration 224. In some examples, the timer expiry value can be and/or can based, at least in part, on the estimated response time of the application server 202.

In examples, the timer can have a value in the range of 100 to 500 milliseconds.

At block 322, the access node 120 transmits, to the terminal node 110, a cancellation of the early acknowledgement 324 for the data transmission 222.

Accordingly, FIG. 3 illustrates a method 300 comprising: transmitting at least part of the data transmission 222 to at least one application server 202; determining a lack of response from the at least one application server 202; and transmitting a cancellation of the early acknowledgement 324 for the data transmission 222.

From the point of view of the terminal node 110, FIG. 3 illustrated a method 300 comprising receiving a cancellation of the early acknowledgement 324 for the data transmission 222.

Any suitable cancellation can be used. For example, any suitable information indicating cancellation of the early acknowledgement 324 can be used. In some examples, the cancellation can be a TCP ACK cancellation.

In examples, the cancellation is transmitted in accordance with the monitoring configuration 224.

In the example of FIG. 3 the cancellation is transmitted at an expected monitoring occurrence after monitoring period 318 transmitted with the monitoring configuration 224.

In examples, after receipt of the cancellation, the terminal node 110 stops monitoring and retransmits at least the data transmission 222.

Figure 4:
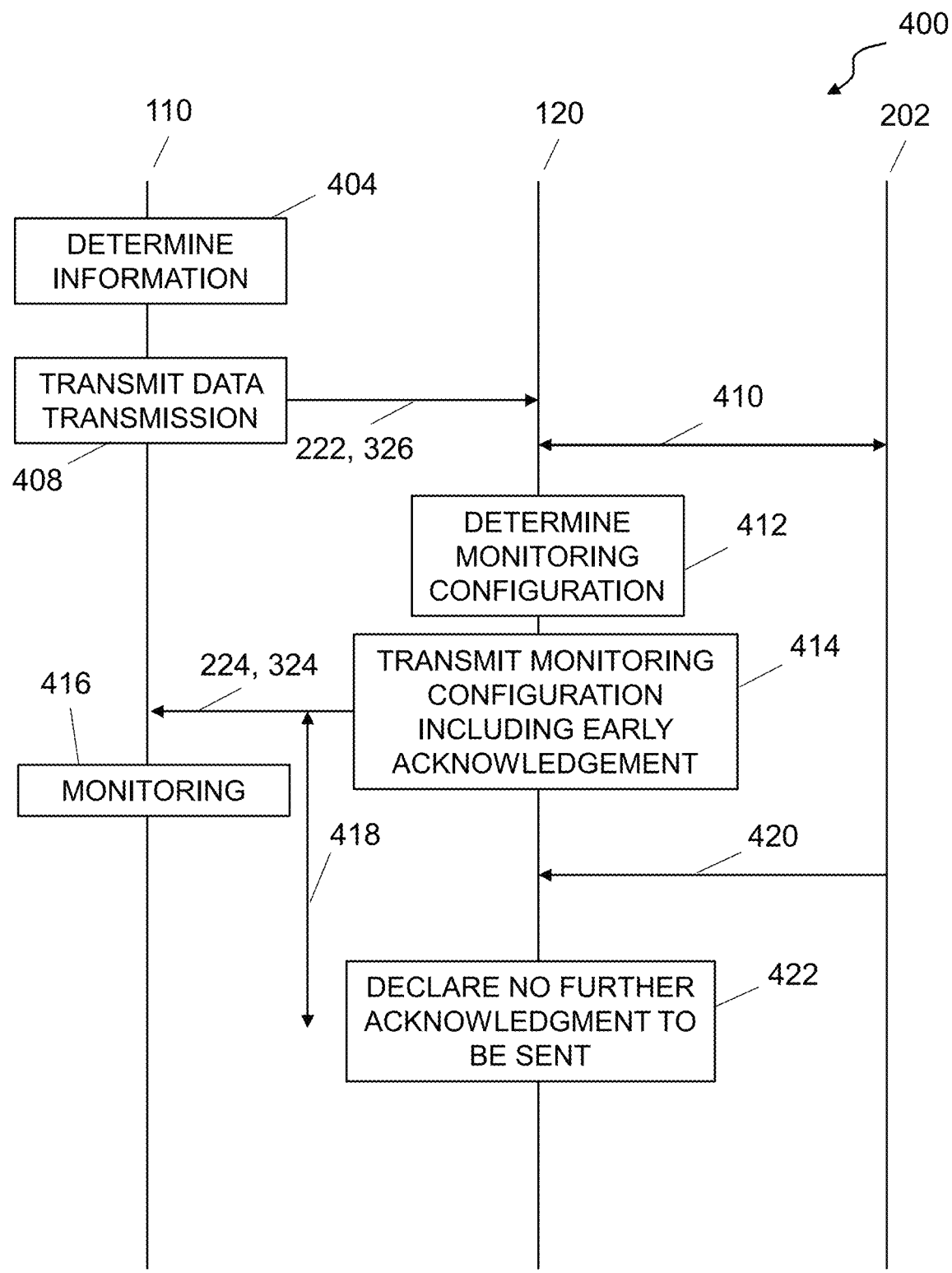
FIG. 4 shows another example of the subject matter described herein.

FIG. 4 illustrates an example of a method 400. The example of FIG. 4 is similar to the example of FIG. 2 and/or FIG. 3. The example of FIG. 4 can be considered an example variant on the example of FIG. 2 and/or FIG. 3.

Accordingly, FIG. 4 should also be considered to disclose a plurality of methods performed by the actors/entities illustrated in the example of FIG. 4.

In the example of FIG. 4, similarly to FIG. 2 and FIG. 3, a terminal node 110, such as a UE, an access node 120, such as an eNB or gNB, and an application server 202 communicate across a network.

In the example of FIG. 4, blocks 404, 408, 410, 412, 414, 416 and 418 can be as described in relation to blocks 304, 308, 310, 312, 314, 316 and 318 of FIG. 3 respectively.

However, in the example of FIG. 4, at block 420 the access node 120 receives a transmission from the application server 202. In the illustrated example, the transmission comprises an acknowledgement for the at least part of the data transmission 222.

The acknowledgement can have any suitable form and can, for example, be an acknowledgement as described in relation to FIG. 2. For example, the acknowledgement can be and/or comprise a TCP ACK.

At block 422 the access node 120 declares that no further acknowledgement for the data transmission 222 is to be sent based, at least in part, on the at least one transmission received from the at least one application server 202.

Accordingly, FIG. 4 illustrates a method 400 comprising:
transmitting at least part of the data transmission 222 to at least one application server 202;
receiving at least one transmission from the at least one application server 202 in response to transmitting at least part of the data transmission 222 to the at least one application server 202; and
declaring that no further acknowledgement for the data transmission 222 is to be sent based, at least in part, on the at least one transmission received from the at least one application server 202.

In examples, the terminal node 110 defers relaying the early acknowledgement 324 to higher layers.

In some examples, the terminal node 110 defers relaying the early acknowledgement 324 to higher layers until it is determined that the early acknowledgement 324 can be considered effective.

In examples, the deferral behavior can be instructed by information in the monitoring configuration 224, such as a flag bit in the header of the message, or can be implicit upon receipt of the early acknowledgement 324.

Any suitable method for determining that the early acknowledgement 324 can be considered effective can be used.

In the example of FIG. 4, the terminal node 110 starts a timer in response to receiving the early acknowledgement 324. In examples, the value for the timer is received in the monitoring configuration 224. In some examples, the value of the timer can be or can be based on the monitoring value 218, 318, 418.

The terminal node 110 forwards the early acknowledgement 324 to one or more higher layers upon expiry of the timer. In examples, the terminal node 110 assumes that the effective acknowledgement is received at the access node 120 if no cancellation is received for the early acknowledgement 324 during the timer period.

In the example of FIG. 4, the timer value is the same as the monitoring period 418. Therefore, in FIG. 4, the terminal node 110 forwards the early acknowledgement 324 to one or more higher layers upon expiry of the period indicated by arrow 418.

FIG. 4 therefore illustrates a method 400 comprising: starting a timer in response to receiving the early acknowledgement 324; and forwarding the early acknowledgement 324 to one or more higher layers upon expiry of the timer.

In the example of FIG. 3, the terminal node 110 can also start a timer in the same way. However, in FIG. 3, the cancellation at block 322 is received prior to expiry of the timer and so the early acknowledgement 324 is not forwarded to one or more higher layers by the terminal node 110.

Figure 5:
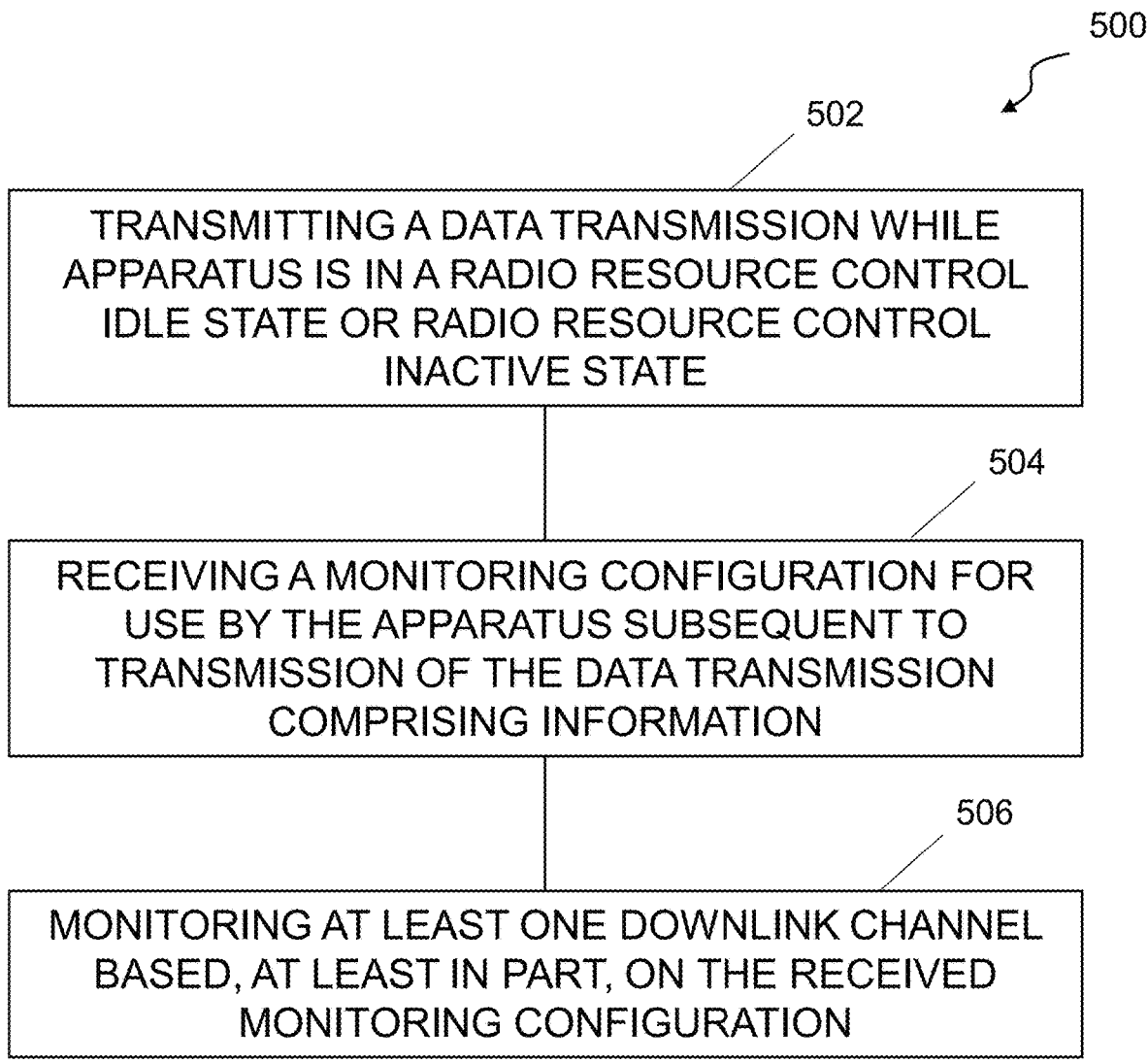
FIG. 5 shows another example of the subject matter described herein.

FIG. 5 illustrates an example of a method 500.

In examples, the method 500 can be performed by any suitable apparatus comprising any suitable means for performing the method 500.

In examples, the method 500 is performed by a terminal node 110, such as a UE.

At block 502, the method 500 comprises transmitting a data transmission 222 while an apparatus is in a RRC idle state or a RRC inactive state.

At block 504, the method 500 comprises receiving a monitoring configuration 224 for use by the apparatus subsequent to transmission of the data transmission 222.

At block 506, the method 500 comprises monitoring at least one downlink channel based, at least in part, on the received monitoring configuration 224.

Consequently, FIG. 5 illustrates a method 500 comprising:
transmitting a data transmission 222 while an apparatus is in a RRC idle or RRC inactive state;
receiving a monitoring configuration 224 for use by the apparatus subsequent to the transmission of the data transmission 222; and
monitoring at least one downlink channel based, at least in part, on the received monitoring configuration 224.

Figure 6:
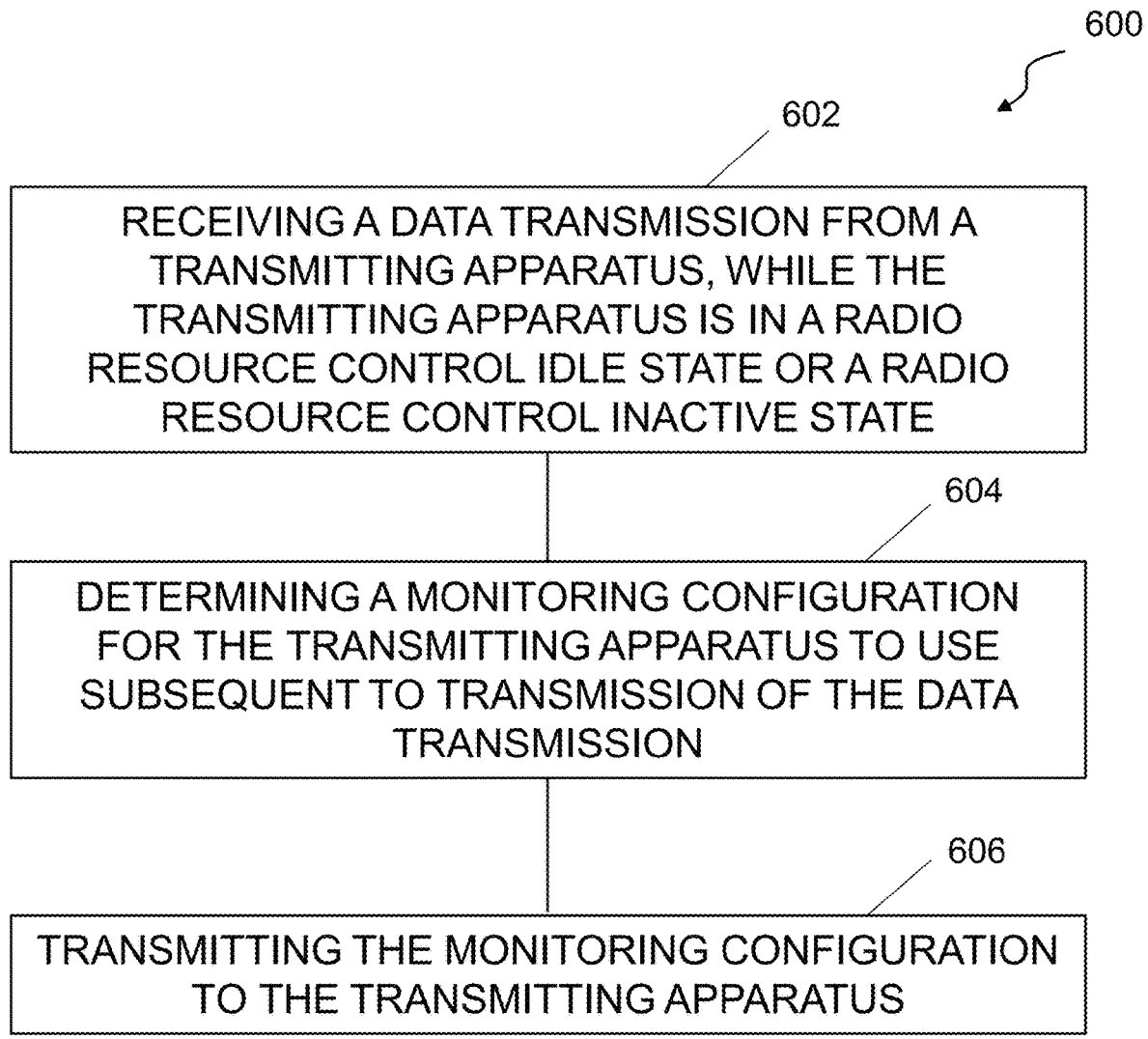
FIG. 6 shows another example of the subject matter described herein.

FIG. 6 illustrates an example of a method 600.

In examples, the method 600 can be performed by any suitable apparatus comprising any suitable means for performing the method 600.

In examples, the method 600 is performed by an access node 120, such as an eNB or gNB.

At block 602, the method 600 comprises receiving a data transmission 222 from a transmitting apparatus, while the transmitting apparatus is in a RRC idle state or a RRC inactive state.

At block 604, the method 600 comprises determining a monitoring configuration 224 for the transmitting apparatus to use subsequent to transmission of the data transmission 222.

At block 606, the method 600 comprises transmitting the monitoring configuration 224 to the transmitting apparatus.

Consequently, FIG. 6 illustrates a method 600 comprising:
 receiving a data transmission 222 from a transmitting apparatus, while the transmitting apparatus is in a RRC idle or a RRC inactive state;
 determining a monitoring configuration 224 for the transmitting apparatus to use subsequent to transmission of the data transmission 222; and
 transmitting the monitoring configuration 224 to the transmitting apparatus.

Some examples relate to 3GPP network. FIGS. 7, 8, 9 and 10 can be considered to illustrate some such examples.

Figure 7:
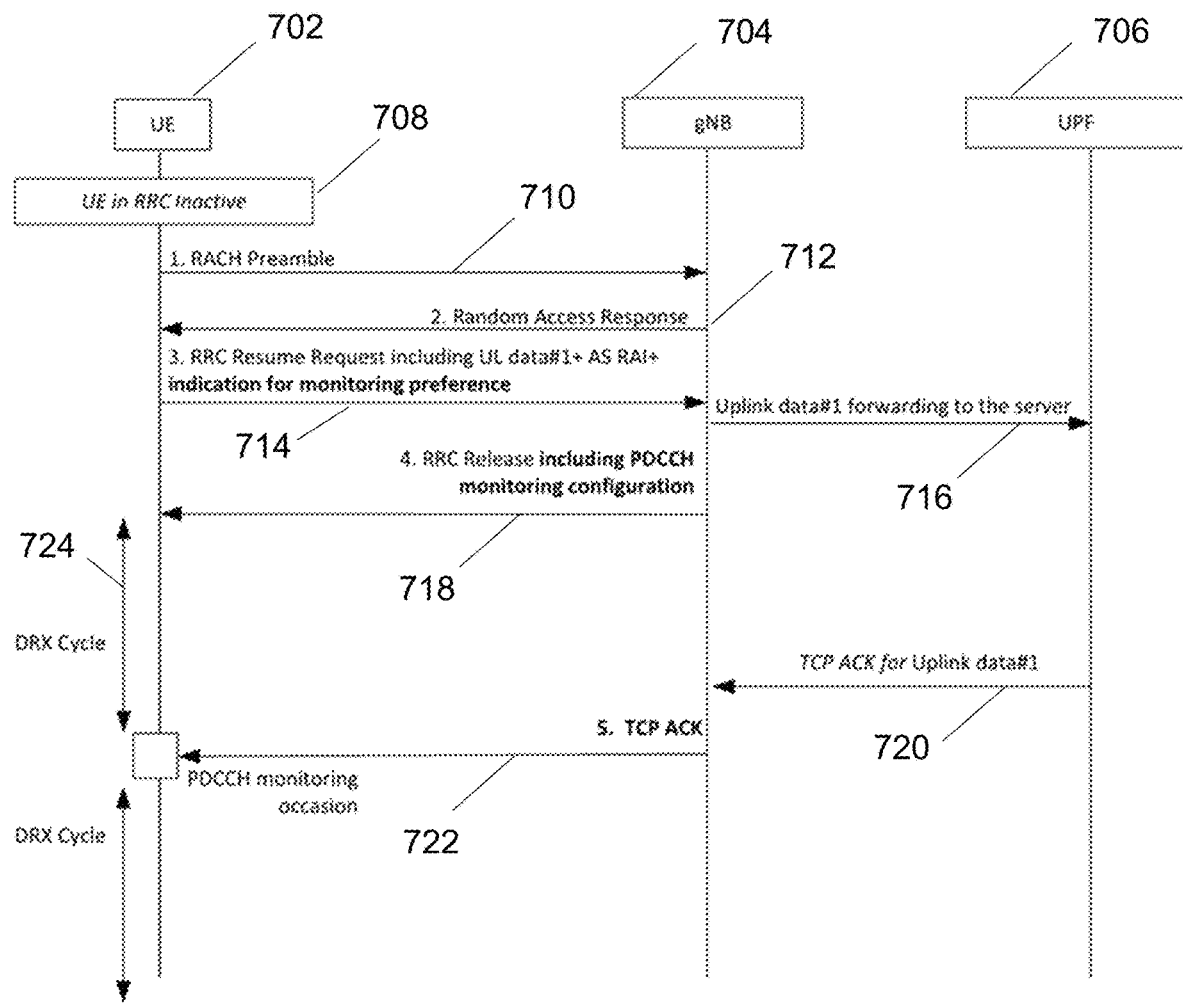
FIG. 7 shows another example of the subject matter described herein.

In the example of FIG. 7 a UE 702, a gNB 704 and a user plane function (UPF) 706 communicate across a network.

As indicated at block 708, the UE 702 is an RRC inactive state.

The UE 708 initiates a RACH procedure at block 710 and received a random access response from the gNB 704 at block 712.

At block 714, in Msg3 of the RACH procedure, the UE 702 transmits to the gNB an RRCResumeRequest message including UL data #1, access stratum release assistance information and an indication for monitoring preference.

UL data #1 can be considered a SDT or information transmitted by a SDT process.

At block 716, the gNB 706 forwards UL data #1 to the UPF 706 and at block 718, in Msg4 of the RACH procedure, the gNB transmits a RRCRelease message including PDCCH monitoring configuration to the UE 702.

The UE 702 performs a DRX cycle 724 according to the PDCCH monitoring configuration.

At block 720, the gNB 704 receives TCP ACK for UL data #1 from the UPF 706 and at block 722 the gNB 704 transmits the TCP ACK to the UE at a configured PDCCH monitoring occasion.

Figure 8:
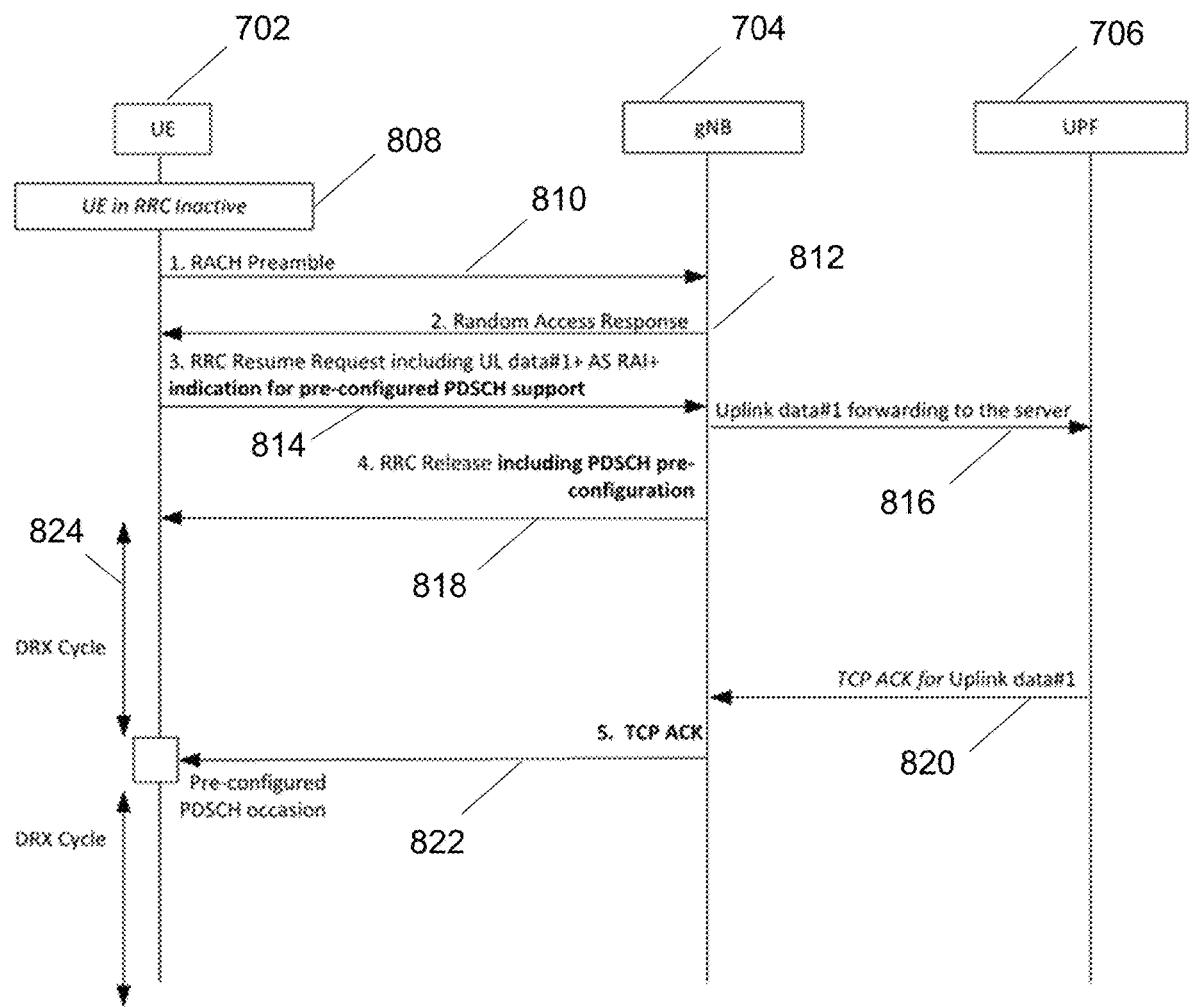
FIG. 8 shows another example of the subject matter described herein.

The example of FIG. 8 is similar to the example of FIG. 7. In FIG. 8 blocks 808 to 824 can be as described in relation to blocks 708 to 724 of FIG. 7 respectively.

However, in the example of FIG. 8, the RRCResumeRequest at block 814 comprises indication for pre-configured PDSCH support instead of indication for monitoring preference.

Consequently, at block 822 of FIG. 8 the TCP ACK is transmitted from the gNB 704 to the UE 702 at a pre-configured PDSCH occasion.

Figure 9:
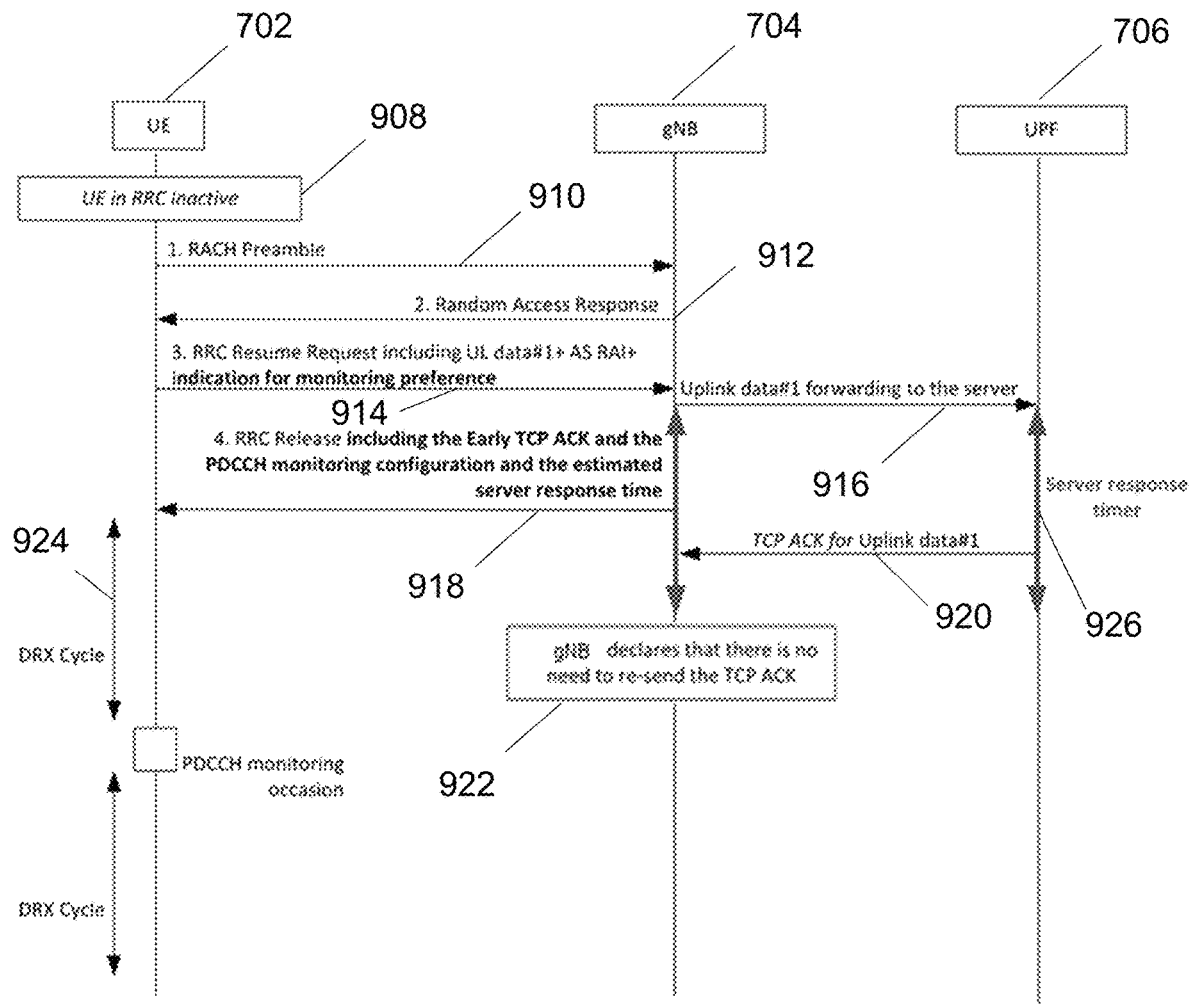
FIG. 9 shows another example of the subject matter described herein.

The example of FIG. 9 is similar to the example of FIG. 7. In FIG. 9 blocks 908 to 920 and 924 can be as described in relation to blocks 708 to 720 and 724 of FIG. 7 respectively.

However, in the example of FIG. 9, at block 918, the RRCRelease message includes an early TCP ACK, the PDCCH monitoring configuration and the estimated server response time. In the example of FIG. 9, the estimated server response time is indicated by arrow 926.

In FIG. 9, the TCP ACK for UL data #1 is received within the estimated server response time 926 and at block 922 the gNB 704 declares that there is no need to re-send the TCP ACK.

Figure 10:
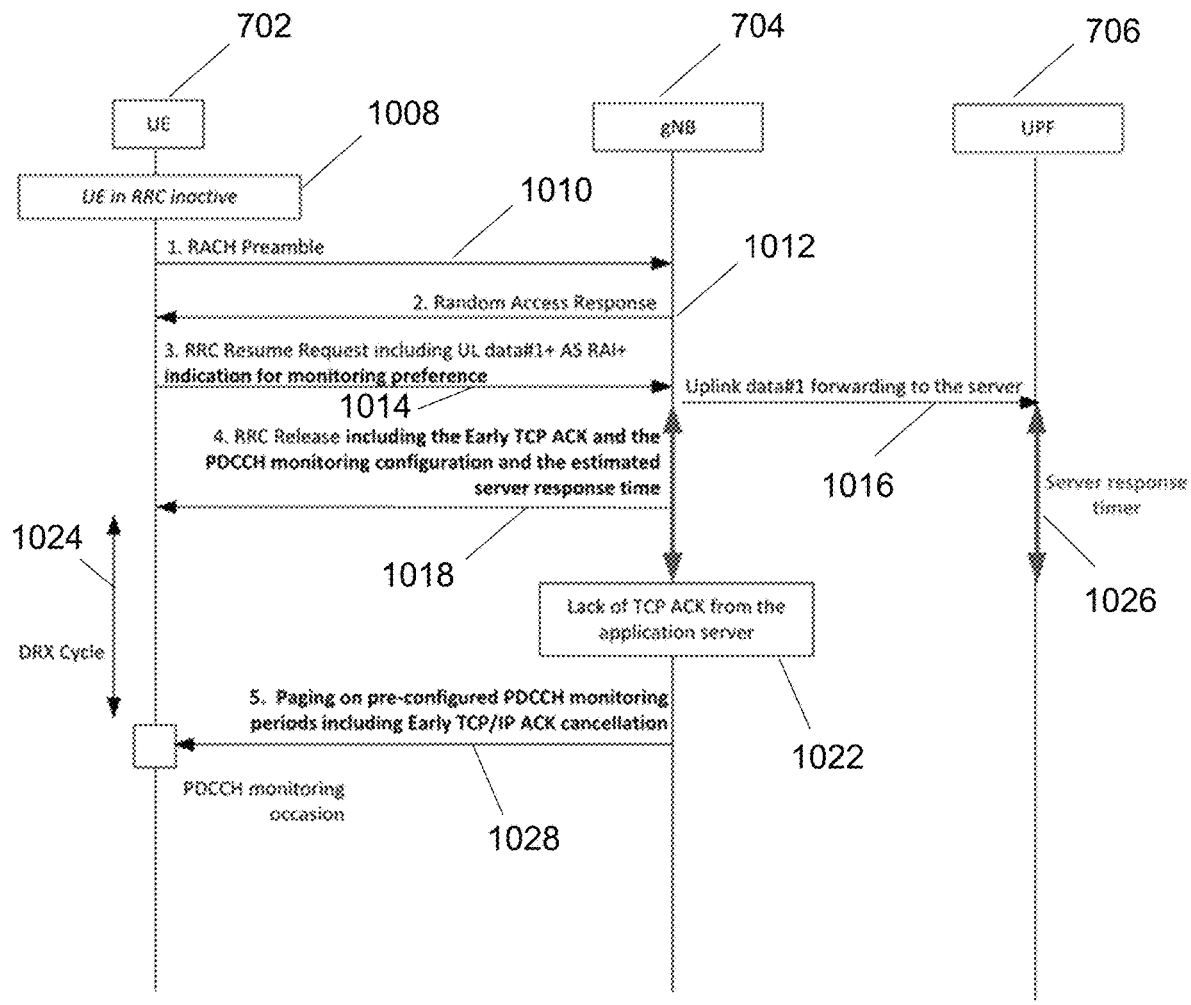
FIG. 10 shows another example of the subject matter described herein.

The example of FIG. 10 is similar to the example of FIG. 9. In FIG. 10 blocks 1008 to 1018, 1024 and 1026 can be as blocks 908 to 918, 924 and 926 of FIG. 9.

However, in the example of FIG. 10, no TCP ACK is received by the gNB 704 from the UPF 706 within the estimated server response time 1026.

At block 1022 the gNB 704 determines a lack of TCP ACK from the UPF 706 and at block 1028 the gNB transmits a paging message that includes an early TCP ACK cancellation at a configured PDCCH monitoring occasion.

Examples of the disclosure are advantageous. For example, examples of the disclosure provide for efficient monitoring by, for example a UE, after a data transmission 222 in RRC idle or RRC inactive state.

In examples, use of an adapted monitoring configuration after EDT or SDT allows for efficient monitoring for subsequent downlink data, such as an acknowledgement.

Examples of the disclosure provide for efficient terminal node, such as UE, power consumption while terminal node is in RRC idle or RRC inactive state.

Furthermore, reduced latency and/or signaling overhead associated with UE reachability is provided.

Figures 11A, 11B:
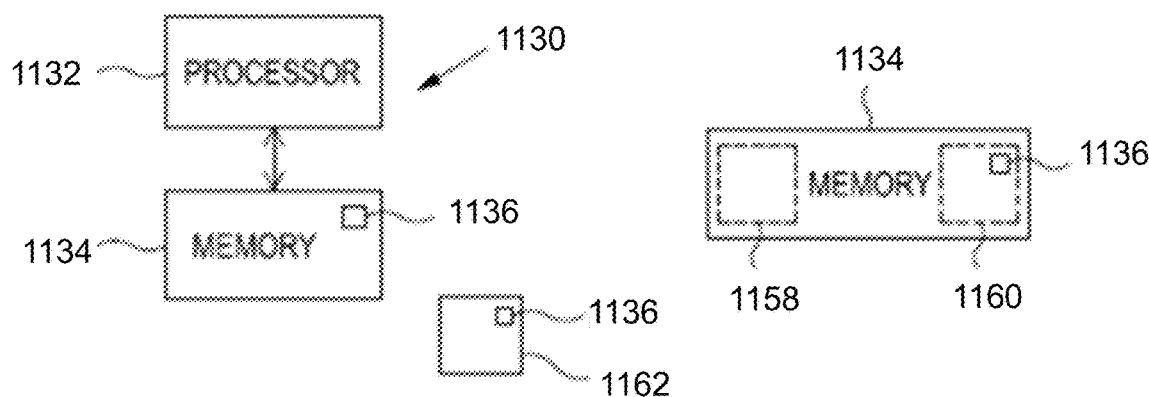
FIG. 11A shows another example of the subject matter described herein.
FIG. 11B shows another example of the subject matter described herein.

FIG. 11A illustrates an example of a controller 1130. The controller 1130 can be used in an apparatus such as a network node 110, 120, 202 such as a mobile terminal or UE, a eNB, and/or a gNB or an application server. Implementation of a controller 1130 may be as controller circuitry. The controller 1130 may be implemented in hardware alone, have certain aspects in software including firmware alone or can be a combination of hardware and software (including firmware).

As illustrated in FIG. 11A the controller 1130 may be implemented using instructions that enable hardware functionality, for example, by using executable instructions of a computer program 1136 in a general-purpose or special-purpose processor 1132 that may be stored on a computer readable storage medium (disk, memory etc) to be executed by such a processor 1132.

The processor 1132 is configured to read from and write to the memory 1134. The processor 1132 may also comprise an output interface via which data and/or commands are output by the processor 1132 and an input interface via which data and/or commands are input to the processor 1132.

The memory 1134 stores a computer program 1136 comprising computer program instructions (computer program code) that controls the operation of the apparatus when loaded into the processor 1132. The computer program instructions, of the computer program 1136, provide the logic and routines that enables the apparatus to perform the methods illustrated in FIGS. 2 and/or 3 and/or 4 and/or 5 and/or 6 and/or 7 and/or 8 and/or 9 and/or 10. The processor 1132 by reading the memory 1134 is able to load and execute the computer program 1136.

The apparatus therefore comprises:
 at least one processor 1132; and
 at least one memory 1134 including computer program code the at least one memory 1134 and the computer program code configured to, with the at least one processor 1132, cause the apparatus at least to perform:

transmitting a data transmission while an apparatus is in a radio resource control idle state or radio resource control inactive state;

receiving a monitoring configuration for use by the apparatus subsequent to transmission of the data transmission;

monitoring at least one downlink channel based, at least in part, on the received monitoring configuration.

The apparatus therefore comprises:

at least one processor 1132; and at least one memory 1134 including computer program code the at least one memory 1134 and the computer program code configured to, with the at least one processor 1132, cause the apparatus at least to perform:

receiving a data transmission from a transmitting apparatus, while the transmitting apparatus is in a radio resource control idle state or a radio resource control inactive state;

determining a monitoring configuration for the transmitting apparatus to use subsequent to transmission of the data transmission;

transmitting the monitoring configuration to the transmitting apparatus.

As illustrated in FIG. 11A, the computer program 1136 may arrive at the apparatus via any suitable delivery mechanism 1162. The delivery mechanism 1162 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 1136. The delivery mechanism may be a signal configured to reliably transfer the computer program 1136. The apparatus may propagate or transmit the computer program 1136 as a computer data signal.

Computer program instructions for causing an apparatus to perform at least the following or for performing at least the following:

transmitting a data transmission while an apparatus is in a radio resource control idle state or radio resource control inactive state;

receiving a monitoring configuration for use by the apparatus subsequent to transmission of the data transmission;

monitoring at least one downlink channel based, at least in part, on the received monitoring configuration.

Computer program instructions for causing an apparatus to perform at least the following or for performing at least the following:

receiving a data transmission from a transmitting apparatus, while the transmitting apparatus is in a radio resource control idle state or a radio resource control inactive state;

determining a monitoring configuration for the transmitting apparatus to use subsequent to transmission of the data transmission;

transmitting the monitoring configuration to the transmitting apparatus.

The computer program instructions may be comprised in a computer program, a non-transitory computer readable medium, a computer program product, a machine readable medium. In some but not necessarily all examples, the computer program instructions may be distributed over more than one computer program.

Although the memory 1134 is illustrated as a single component/circuitry it may be implemented as one or more separate components/circuitry some or all of which may be integrated/removable and/or may provide permanent/semi-permanent/dynamic/cached storage.

In examples the memory 1134 comprises a random access memory 1158 and a read only memory 1160. In examples the computer program 1136 can be stored in the read only memory 1158. See, for example, FIG. 11B.

In some examples the memory 1134 can be split into random access memory 1158 and read only memory 1160.

Although the processor 1132 is illustrated as a single component/circuitry it may be implemented as one or more separate components/circuitry some or all of which may be integrated/removable. The processor 1132 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIGS. 2 and/or 3 and/or 4 and/or 5 and/or 6 and/or 7 and/or 8 and/or 9 and/or 10 may represent steps in a method and/or sections of code in the computer program 1136. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

Thus, the apparatus can, in examples, comprises means for:
transmitting a data transmission while an apparatus is in a radio resource control idle state or radio resource control inactive state;
receiving a monitoring configuration for use by the apparatus subsequent to transmission of the data transmission;
monitoring at least one downlink channel based, at least in part, on the received monitoring configuration.

Thus, the apparatus can, in examples, comprises means for:
receiving a data transmission from a transmitting apparatus, while the transmitting apparatus is in a radio resource control idle state or a radio resource control inactive state;
determining a monitoring configuration for the transmitting apparatus to use subsequent to transmission of the data transmission;
transmitting the monitoring configuration to the transmitting apparatus.

In examples, an apparatus can comprise means for performing one or more methods, or at least part of one or more methods, as disclosed herein.

In examples, an apparatus can be configured to perform one or more methods, or at least part of one or more methods, as disclosed herein.

The above described examples find application as enabling components of:
automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

The invention claimed is:

1. An apparatus comprising
at least one processor; and
at least one memory including computer program code;
the at least one memory and the computer program code configured to, with the at least one processor, cause the apparatus at least to perform:

transmitting a data transmission while the apparatus is in a radio resource control inactive state and without causing an associated radio resource control protocol, RRC, state switching at the apparatus;

receiving a monitoring configuration for use by the apparatus subsequent to transmission of the data transmission, the monitoring configuration comprising at least a physical downlink control channel, PDCCH, monitoring configuration;

monitoring at least one downlink channel based, at least in part, on the received monitoring configuration;

receiving at least one subsequent transmission in accordance with the received monitoring configuration;

determining if the at least one subsequent transmission comprises information about the data transmitted by the apparatus;

if it is determined that nothing is received in the at least one subsequent transmission, retransmitting the data transmission; and stopping the monitoring based on at least expiry of a monitoring timer.

2. The apparatus as claimed in claim 1, wherein the monitoring configuration comprises information to configure, at least in part, the monitoring of the at least one downlink channel subsequent to transmission of the data transmission.

3. The apparatus as claimed in claim 2, wherein the monitoring configuration comprises at least one of:
one or more monitoring periods;
one or more number of monitoring occasions;
a discontinuous reception, DRX, configuration;
one or more physical downlink control channel, PDCCH, search space configurations; or
one or more monitoring timer values.

4. The apparatus as claimed in claim 1,
wherein the at least one subsequent transmission comprises at least one acknowledgment of the data transmission transmitted by the apparatus and/or subsequent downlink data transmission.

5. The apparatus as claimed in claim 1, the at least one memory and the computer program code configured to, with the at least one processor, cause the apparatus at least to perform:
stopping the monitoring based, at least in part, on one or more conditions; wherein the one or more conditions comprise at least one of:
performance of a predetermined number of monitoring occasions;
receiving one or more signals comprising information indicating to stop monitoring; or
receiving an acknowledgment of the data transmission.

6. The apparatus as claimed in claim 1, the at least one memory and the computer program code configured to, with the at least one processor, cause the apparatus at least to perform:
receiving an early acknowledgment for the data transmission.

7. The apparatus as claimed in claim 6, wherein the early acknowledgement for the data transmission is received with the monitoring configuration.

8. The apparatus as claimed in claim 6, the at least one memory and the computer program code configured to, with the at least one processor, cause the apparatus at least to perform:
receiving a cancellation of the early acknowledgement for the data transmission.

9. The apparatus as claimed in claim 6, the at least one memory and the computer program code configured to, with the at least one processor, cause the apparatus at least to perform:
starting a timer in response to receiving the early acknowledgement; and
forwarding the early acknowledgement to one or more higher layers upon expiry of the timer.

10. The apparatus as claimed in claim 1, the at least one memory and the computer program code configured to, with the at least one processor, cause the apparatus at least to perform:
determining assistance information to be used in determining the monitoring configuration; and
transmitting the determined assistance information.

11. The apparatus as claimed in claim 10, wherein the assistance information comprises at least one of:
one or more monitoring preferences; or
support for preconfigured physical downlink shared channel, PDSCH, transmission within the resource used for monitoring physical downlink control channel, PDCCH.

12. A method comprising:
transmitting, by an apparatus, a data transmission while an apparatus is in a radio resource control idle state or radio resource control inactive state and without causing an associated radio resource control protocol, RRC, state switching at the apparatus;
receiving a monitoring configuration for use by the apparatus subsequent to transmission of the data transmission, the monitoring configuration comprising at least a physical downlink control channel, PDCCH, monitoring configuration;
monitoring at least one downlink channel based, at least in part, on the received monitoring configuration;
receiving at least one subsequent transmission in accordance with the received monitoring configuration;
determining if the at least one subsequent transmission comprises information about the data transmitted by the apparatus;
if it is determined that nothing is received in the at least one subsequent transmission, retransmitting the data transmission; and
stopping the monitoring based on at least expiry of a monitoring timer.

13. The method as claimed in claim 12, wherein the monitoring configuration comprises information to configure, at least in part, the monitoring of the at least one downlink channel subsequent to transmission of the data transmission.

* * * * *